United States Patent
Nubile et al.

(10) Patent No.: US 11,681,467 B2
(45) Date of Patent: Jun. 20, 2023

(54) CHECKING STATUS OF MULTIPLE MEMORY DIES IN A MEMORY SUB-SYSTEM

(71) Applicant: Micron Technology, Inc., Boise, ID (US)

(72) Inventors: Luca Nubile, Sulmona (IT); Luca De Santis, Avezzano (IT)

(73) Assignee: Micron Technology, Inc., Boise, ID (US)

( * ) Notice: Subject to any disclaimer, the term of this patent is extended or adjusted under 35 U.S.C. 154(b) by 42 days.

(21) Appl. No.: 16/946,871

(22) Filed: Jul. 9, 2020

(65) Prior Publication Data

US 2022/0011970 A1 Jan. 13, 2022

(51) Int. Cl.
G06F 3/06 (2006.01)

(52) U.S. Cl.
CPC .......... G06F 3/0659 (2013.01); G06F 3/0604 (2013.01); G06F 3/0673 (2013.01)

(58) Field of Classification Search
CPC ..... G06F 3/0659; G06F 3/0604; G06F 3/0673
See application file for complete search history.

(56) References Cited

U.S. PATENT DOCUMENTS

| | | | |
|---|---|---|---|
| 2008/0297199 A1 | 12/2008 | Grunzke | |
| 2013/0254467 A1* | 9/2013 | Parizi | G06F 3/0688 711/103 |
| 2013/0326090 A1 | 12/2013 | Gillingham | |
| 2013/0339638 A1* | 12/2013 | Lazmi | G06F 13/1684 711/E12.001 |
| 2015/0009773 A1 | 1/2015 | Grunzke | |
| 2016/0093379 A1 | 3/2016 | Siciliani et al. | |
| 2016/0110119 A1 | 4/2016 | Singh et al. | |
| 2016/0224246 A1* | 8/2016 | Shah | G06F 3/0659 |
| 2016/0259553 A1* | 9/2016 | Buxton | G06F 3/0688 |
| 2017/0206037 A1* | 7/2017 | Shin | G06F 3/0688 |
| 2017/0212709 A1* | 7/2017 | Oh | G06F 3/0659 |
| 2018/0275918 A1* | 9/2018 | Tanefusa | G06F 3/0679 |
| 2019/0227749 A1* | 7/2019 | Wakchaure | G11C 16/0483 |
| 2021/0048960 A1* | 2/2021 | Son | G06F 3/0673 |
| 2022/0091775 A1* | 3/2022 | Shridhar | G06F 3/0679 |
| 2022/0230664 A1* | 7/2022 | Cariello | G11C 7/1048 |

OTHER PUBLICATIONS

International Search Report and Written Opinion for International Application No. PCT/US2021/041173, dated Nov. 2, 2021, 13 pages.

* cited by examiner

*Primary Examiner* — Prasith Thammavong
(74) *Attorney, Agent, or Firm* — Lowenstein Sandler LLP

(57) ABSTRACT

A processing device in a memory sub-system assigns each of a plurality of memory units associated with one or more memory die of a memory device a unique address by which each of the plurality of memory units is identified. The processing device further sends a multi-unit status command to the memory device, the multi-unit status command specifying a subset of the plurality of memory units using corresponding unique addresses and receives a response to the multi-unit status command, the response comprising a multi-bit value comprising a plurality of bits, wherein each bit of the plurality of bits represents a status of one or more parameters of a plurality of parameters for a corresponding one of the plurality of memory units.

20 Claims, 7 Drawing Sheets

CHECKING STATUS OF MULTIPLE MEMORY DIES IN A MEMORY SUB-SYSTEM

TECHNICAL FIELD

Embodiments of the disclosure relate generally to memory sub-systems, and more specifically, relate to checking the status of multiple memory dies in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
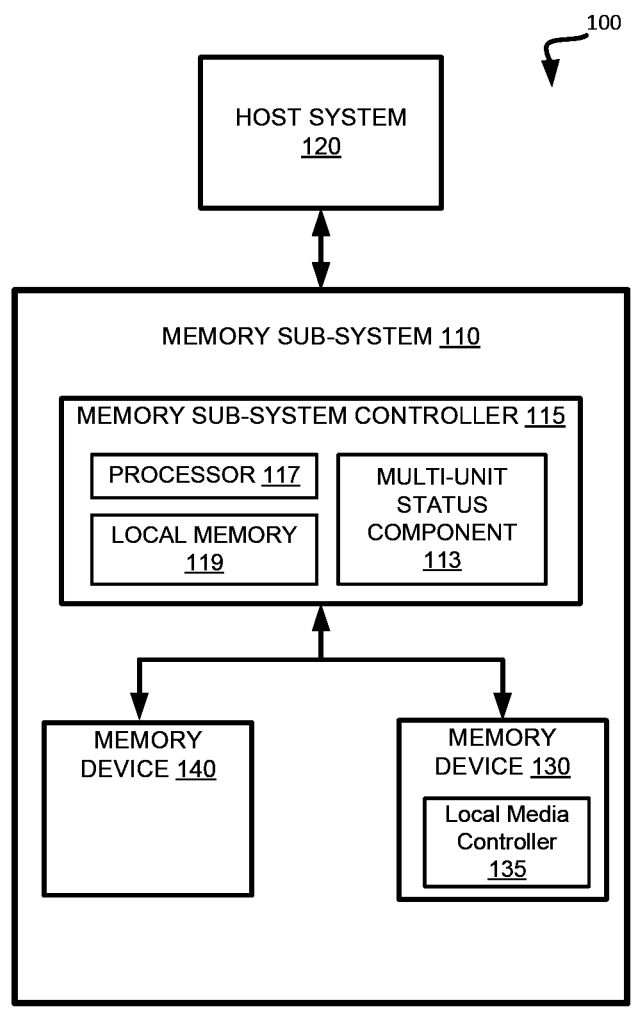
FIG. 1 illustrates an example computing system that includes a memory sub-system in accordance with some embodiments of the present disclosure.

Aspects of the present disclosure are directed to checking the status of multiple memory dies in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more memory dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional grid or a three-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

The memory sub-system further includes a memory sub-system controller that can communicate with the memory devices to perform operations such as reading data, writing data, or erasing data at the memory devices and other such operations. A memory sub-system controller is described in greater below in conjunction with FIG. 1. The operations can be performed in response to access requests (e.g., write commands, read commands) sent by a host system to the memory sub-system, such as to store data on a memory device of the memory sub-system and to read data from the memory device of the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. The metadata and host data, together, is hereinafter referred to as "payload." The operations can further be initiated by the memory sub-system as media management operations, which can include executing, for example a write operation or read operation, on host data that is stored on a memory device. For example, the memory sub-system can re-write previously written host data from a location on a memory device to the same location or a new location as part of a write refresh operation. In another example, the media management operations can include a re-read of host data that is stored on a memory device as part of a read refresh operation.

As described above, a non-volatile memory device can include a number of individual dies. The memory sub-system controller can include a number of input/output (I/O) ports and channels by which the memory sub-system controller can communicate with the individual dies. For example, there can be eight communication channels between the memory sub-system controller and the non-volatile memory device, where each channel can be enabled with a separate chip enable (CE) signal. Each communication channel can support a certain number of memory dies. For example, there can be 16 memory dies accessible via each channel. Each individual memory die can be configured as an individual logic unit, identified by a unique logical unit number (LUN). Thus, a system with eight communication channels, and 16 LUNs per channel, can include 128 separate LUNs.

During the course of performing certain operations, the memory sub-system controller often checks the status of the various LUNs in the memory sub-system. For example, after submitting a read command to a memory device, the memory sub-system controller can periodically poll the memory device to check whether the requested I/O data is ready for readout. In some systems, the memory controller sends a status polling command to one individual LUN. In response, the LUN returns an eight bit value indicating the status of one or more parameters of the LUN and/or memory die. For example, one of the eight bits indicates whether the I/O data is ready for readout, and the remaining seven bits are associated with other statuses. Such status polling operations can be performed once every 1 microsecond on a given LUN, for example. In a memory sub-system with a large number of LUNs (e.g., 128 LUNs) and under a heavy workload, the number and frequency of these status polling operations being performed on individual LUNs introduces significant system overhead and occupies considerable bandwidth in the communication channels between the memory sub-system controller and the memory devices in the memory sub-system. This issue is exacerbated in systems where a memory die implements independent wordlines with separate circuitry that allows multiple planes of a memory die to be accessed concurrently. In such a situation, the status of each individual plane is polled at the same frequency as described above. Thus, if a memory die has four separate planes, the bus traffic over the communication channels also increases by a factor of four.

Aspects of the present disclosure address the above and other deficiencies by checking the status of multiple memory dies in a memory sub-system. In one embodiment, the memory sub-system determines whether to check a status of one or more dies of a memory device in the memory sub-system as part of performing a memory access operation. For example, as part of performing some access operations, the memory sub-system controller can check the status of certain parameters of the memory dies, which are associated with a communication channel coupled to the memory device. In one embodiment, the memory sub-system controller sends a multi-unit status command to the memory device. The multi-unit status command can specify multiple memory units associated with the one or more memory dies of the memory device. In one embodiment, each memory unit includes a LUN associated with one of the memory dies. In another embodiment, each memory unit includes a separate plane or group of planes of a multi-plane memory die. The memory sub-system controller further receives a response to the multi-unit status command including a multi-bit value representing a status of one or more parameters for the multiple memory units. In one embodiment, each bit of the multi-bit value represents the status of a first parameter for a corresponding one of the memory units. For example, the status of the first parameter can indicate whether an input/output (I/O) status of the LUN or plane is in a ready state or a busy state. In response to determining that a given memory unit is in the ready state, the memory sub-system controller can send an I/O command to that memory unit.

Using a multi-unit status command to check the status of multiple memory dies in a single operation can lead to significant improvements in the memory sub-system. Since the multi-unit status command causes the memory device to return an indication of the status of multiple LUNs or planes, the memory sub-system controller does not have to send a separate status command to each individual LUN or plane in the memory sub-system. This decreased number of commands reduces the time required to poll the status of the memory dies in the memory sub-system and reduces the overall overhead. In addition, bus traffic on the communication channels between the memory sub-system controller and the memory devices is reduced, which allows for an increase in the rate at which operations are performed in the memory sub-system (e.g., input/output operations per second (IOPs)) and a reduction in power utilization for status polling operations.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory sub-system 110 is a managed memory device, which includes a raw memory device 130 having control logic (e.g., local controller 132) on the die and a controller (e.g., memory sub-system controller 115) for media management within the same memory device package. An example of a managed memory device is a managed NAND (MNAND) device.

In one embodiment, the memory sub-system 110 includes a multi-unit status component 113 that checks the status of multiple memory dies in memory sub-system 110. In one embodiment, memory sub-system controller determines whether to check a status of one or more dies of a memory device, such as memory device 130. For example, as part of performing certain access operations, the memory sub-system controller 115 can check the status of certain parameters of the memory dies, which are associated with a communication channel (e.g., part of the NVMe interface) coupled between memory sub-system controller 115 and memory device 130. In one embodiment, multi-unit status component 113 sends a multi-unit status command to memory device 130. The multi-unit status command can specify multiple memory units associated with the one or more memory dies of memory device 130. In one embodiment, each memory unit includes a LUN associated with one of the memory dies. In another embodiment, each memory unit includes a separate plane or group of planes of a multi-plane memory die. Multi-unit status component 113 receives a response to the multi-unit status command including a multi-bit value representing a status of one or more parameters for the multiple memory units. In one embodiment, each bit of the multi-bit value represents the status of a first parameter for a corresponding one of the memory units. For example, the status of the first parameter can indicate whether an input/output (I/O) status of the LUN or plane is in a ready state or a busy state. In this manner, multi-unit status component 113 can determine the status of certain parameters for multiple memory units using a single status command. Further details with regards to the operations of multi-unit status component 113 are described below.

In some embodiments, the memory sub-system controller 115 includes at least a portion of multi-unit status component 113. For example, the memory sub-system controller 115 can include a processor 117 (e.g., a processing device) configured to execute instructions stored in local memory 119 for performing the operations described herein. In some embodiments, multi-unit status component 113 is part of the host system 110, an application, or an operating system. In other embodiment, local media controller 135 includes at least a portion of multi-unit status component 113 and is configured to perform the functionality described herein.

For example, in one embodiment, control logic (e.g., part of local media controller 135) can be configured to recognize a multi-unit status command received from memory sub-system controller 115. In response, the control logic can check the status of one or more memory die as indicated by the multi-unit status command and generate the corresponding response to the multi-unit status command. As described herein, the response can include a multi-bit value where each represents the status of a first parameter for a corresponding one of the memory die.

Figure 2:
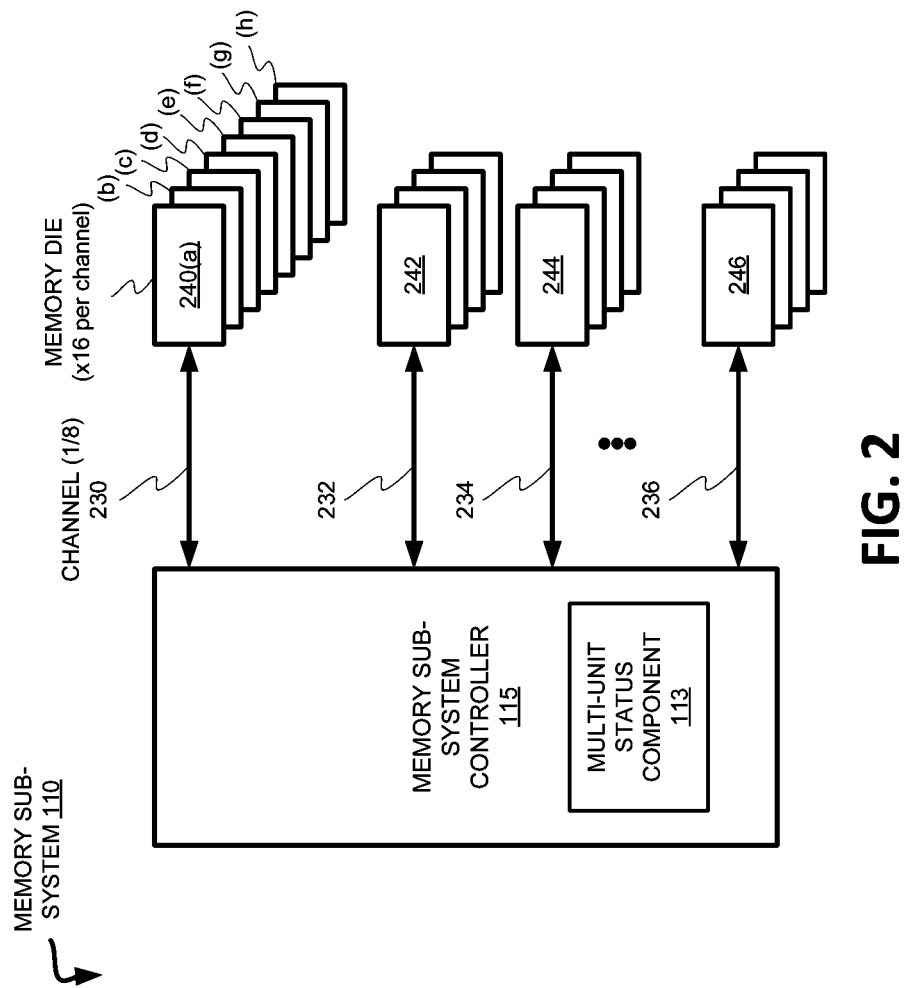
FIG. 2 is a block diagram illustrating checking the status of multiple memory dies in a memory sub-system in accordance with some embodiments of the present disclosure.

FIG. 2 is a block diagram illustrating checking the status of multiple memory dies in a memory sub-system in accordance with some embodiments of the present disclosure. In one embodiment, memory sub-system controller 115 includes a number of host input/output ports, each having a corresponding communication channel. For example, channels 230, 232, 234, and 236 illustrated in FIG. 2 can be any of multiple channels connected to memory sub-system controller 115. Depending on the embodiment, memory sub-system controller 115, can have two channels, four channels, eight channels, or some other number of channels. As the number of input/output ports and communication channels increases, so too does the complexity, cost, and size of the memory sub-system controller 115. Thus, it can be desirable to limit the number of input/output ports and communication channels in the memory sub-system controller 115.

Accordingly, each of the communication channels can support multiple memory devices (e.g., NAND memory dies). In one embodiment, memory dies 240(a)-(h) are connected to channel 230, memory die 242 are connected to channel 232, memory die 244 are connected to channel 234, and memory die 246 are connected to channel 236. In one embodiment, each communication channel is connected to the same number of memory dies. Depending on the embodiment, each communication channel can be connected to two memory dies, four memory dies, eight memory dies, 16 memory dies, or some other number of memory dies. In other embodiments, however, each communication channel can be connected to a different number of memory dies. For example, one channel could be connected to eight memory dies, while another expansion channel could be connected to four memory dies.

In one embodiment, multi-unit status component 113 sends one or more multi-unit status commands from memory sub-system controller 115 to memory device 130. The multi-unit status commands can be a part of a polling operation intended to determine a status of one or more memory units. For example, as part of the polling operation, multi-unit status component 113 can periodically send multi-unit status commands to determine the status of all or a sub-set of the memory units in the memory sub-system. Any one multi-unit status command can specify multiple memory units to which it is directed and can be sent via a corresponding communication channel. In one embodiment, each memory unit includes a LUN associated with one of the memory dies. For example, each of the memory dies 240(a)-(h) can have an associated logical unit, identified by a corresponding LUN. Thus, a multi-unit status command sent via communication channel 230 can specify the LUNs associated with memory dies 240(a)-(h). In one embodiment, the memory units are specified using a multi-die select (MDS) addressing scheme that uniquely identifies each LUN. In the MDS addressing scheme, each individual memory unit is addressed using a unique address associated with that individual memory unit. The unique address can be generated based on the chip enable in the memory device and/or the number of memory units per package (i.e., chip enable and/or number of LUNs per package). In another embodiment, the memory units are specified using a unique address designated for purposes of performing a multi-unit status check operation. Each unit (e.g., LUN or plane) can be assigned a unique address to which multi-unit status commands can be directed. In response to receiving the multi-unit status command, each memory die 240(*a*)-(*h*) can return an indication of a status of one or more parameters, such as whether an input/output (I/O) status of the LUN is in a ready state or a busy state, an array status, a pass/fail status, a program suspend or erase suspend status, or other parameters. For example, a single bit can be set to a first value (e.g., 0) to indicate a first state (e.g., the ready state) or to a second value (e.g., 1) to indicate a second state (e.g., the busy state) for a given LUN, or vice versa. Logic on the memory device 130, such as in local media controller 135, can combine the values from each LUN together to form a multi-bit value representing the status of one or more parameters for multiple memory units. In one embodiment, the response to the multi bit status command utilizes a data bus (e.g., DQ bus) used to input data to and from the memory device. For example, if the data bus includes a certain number of pins (e.g., 8 pins) each used to transmit the value of a single bit, rather than using all pins of the data bus to transmit the status of one memory die, each pin can be used to transmit the status of one memory die. So with 8 pins, the response can include the status of 8 memory die.

Multi-unit status component 113 can receive, via communication channel 230, a response to the multi-unit status command including the multi-bit value. In one embodiment, each bit of the multi-bit value represents the status of a first parameter for a corresponding one of the memory units. In one embodiment, the multi-bit value includes eight bits, and thus can represent the status of the first parameter for the eight LUNs associated with memory dies 240(*a*)-(*h*). In another embodiment, multiple bits of the multi-bit value can represent the status of multiple parameters for a corresponding memory unit. For example, there could be two bits per memory unit, where each bit represents the status of a different parameter for the same memory unit. In such a scenario, the multi-bit value represents the status of the two parameters for four LUNs. In other embodiments, the multi-bit value can include some other number of bits and/or can represent the status of some other number of parameters for some other number of memory units. Each bit of the multi-bit value can be associated with a certain memory unit according to the MDS addressing scheme, thereby allowing multi-unit status component 113 to correctly decode the response to the multi-unit status command. In another embodiment, the memory units are specified using a unique address designated for purposes of performing a multi-unit status check operation.

In another embodiment, one or more of memory dies 240(*a*)-(*h*) are multi-plane memory devices. In such a situation, each memory unit can include an individual plane of a memory die. Accordingly, the multi-unit status command can indicate multiple planes and the multi-bit value can indicate the status of one or more parameters for the multiple planes of one or more memory dies. Additional details are described below with respect to FIG. 3.

Figure 3:
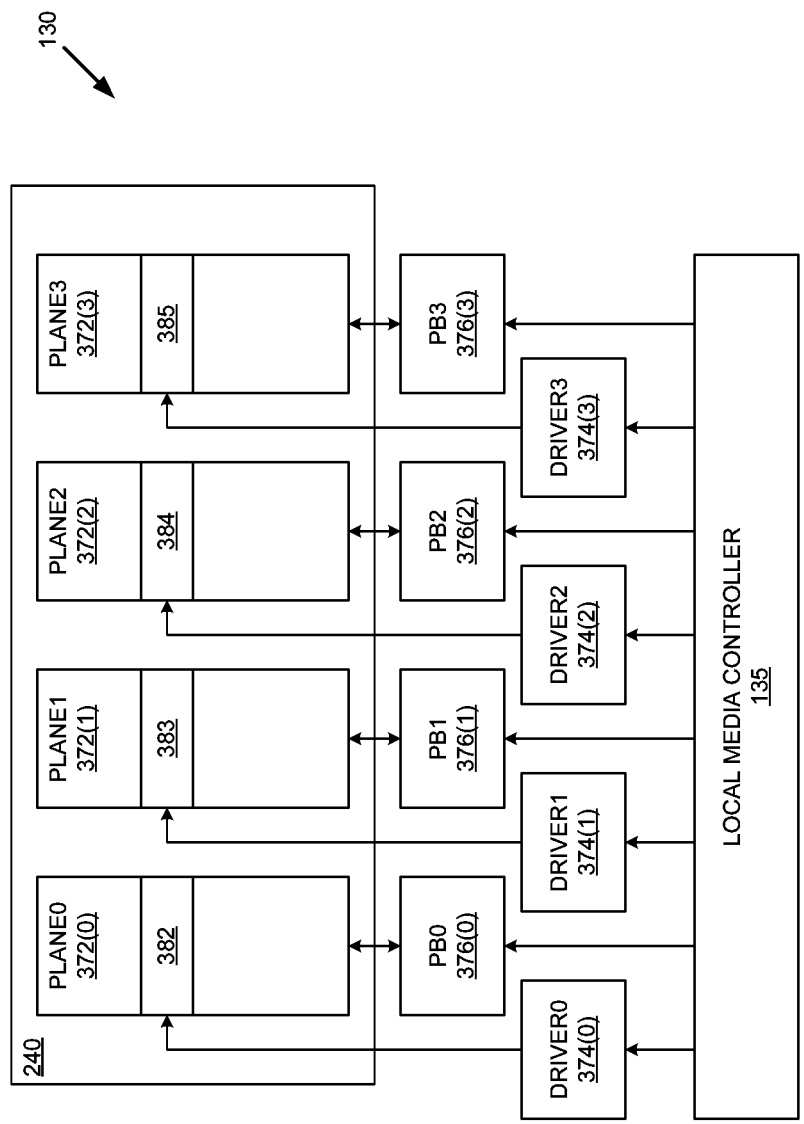
FIG. 3 is a block diagram illustrating a multi-plane memory device configured to receive a multi-unit status command in accordance with some embodiments of the present disclosure.

FIG. 3 is a block diagram illustrating a multi-plane memory device configured to receive a multi-unit status command in accordance with some embodiments of the present disclosure. The memory device 130 includes a memory die 240, such as one of memory dies 240(*a*)-(*h*), divided into memory planes 372(0)-372(3) that each includes a respective number of memory cells. The multi-plane memory device 130 can further include local media controller 135, including a power control circuit and access control circuit for concurrently performing memory access operations for different memory planes 372(0)-372(3). The memory cells can be non-volatile memory cells, such as NAND flash cells, or can generally be any type of memory cells.

The memory planes 372(0)-372(3) can each be divided into blocks of data, with a different relative block of data from each of the memory planes 372(0)-372(3) concurrently accessible during memory access operations. For example, during memory access operations, data block 382 of the memory plane 372(0), data block 383 of the memory plane 372(1), data block 384 of the memory plane 372(2), and data block 385 of the memory plane 372(3) can each be accessed concurrently.

Each of the memory planes 372(0)-372(3) can be coupled to a respective page buffer 376(0)-376(3). Each page buffer 376(0)-376(3) can be configured to provide data to or receive data from the respective memory plane 372(0)-372(3). The page buffers 376(0)-376(3) can be controlled by local media controller 135. Data received from the respective memory plane 372(0)-372(3) can be latched at the page buffers 376(0)-376(3), respectively, and retrieved by local media controller 135, and provided to the memory sub-system controller 115 via the NVMe interface.

Each of the memory planes 372(0)-372(3) can be further coupled to a respective access driver circuit 374(0)-374(3), such as an access line driver circuit. The driver circuits 374(0)-374(3) can be configured to condition a page of a respective block of an associated memory plane 372(0)-372(3) for a memory access operation, such as programming data (i.e., writing data), reading data, or erasing data. Each of the driver circuits 374(0)-374(3) can be coupled to a respective global access lines associated with a respective memory plane 372(0)-372(3). Each of the global access lines can be selectively coupled to respective local access lines within a block of a plane during a memory access operation associated with a page within the block. The driver circuits 374(0)-374(3) can be controlled based on signals from local media controller 135. Each of the driver circuits 374(0)-374(3) can include or be coupled to a respective power circuit, and can provide voltages to respective access lines based on voltages provided by the respective power circuit. The voltages provided by the power circuits can be based on signals received from local media controller 135.

The local media controller 135 can control the driver circuits 374(0)-374(3) and page buffers 376(0)-376(3) to concurrently perform memory access operations associated with each of a group of memory command and address pairs (e.g., received from memory sub-system controller 115). For example, local media controller 135 can control the driver circuits 374(0)-374(3) and page buffer 376(0)-376(3) to perform the concurrent memory access operations. Local media controller 135 can include a power control circuit that serially configures two or more of the driver circuits 374(0)-374(3) for the concurrent memory access operations, and an access control circuit configured to control two or more of the page buffers 376(0)-376(3) to sense and latch data from the respective memory planes 372(0)-372(3), or program data to the respective memory planes 372(0)-372(3) to perform the concurrent memory access operations.

In operation, local media controller 135 can receive a group of memory command and address pairs via the NVMe bus, with each pair arriving in parallel or serially. In some examples, the group of memory command and address pairs can each be associated with different respective memory planes 372(0)-372(3) of the memory die 240. The local media controller 135 can be configured to perform concurrent memory access operations (e.g., read operations or program operations) for the different memory planes 372(0)-372(3) of the memory die 240 responsive to the group of memory command and address pairs. For example, the power control circuit of local media controller 135 can serially configure, for the concurrent memory access operations based on respective page type (e.g., UP, MP, LP, XP, SLC/MLC/TLC/QLC page), the driver circuits 374(0)-374(3) for two or more memory planes 372(0)-372(3) associated with the group of memory command and address pairs. After the access line driver circuits 374(0)-374(3) have been configured, the access control circuit of local media controller 135 can concurrently control the page buffers 376(0)-376(3) to access the respective pages of each of the two or more memory planes 372(0)-372(3) associated with the group of memory command and address pairs, such as retrieving data or writing data, during the concurrent memory access operations. For example, the access control circuit can concurrently (e.g., in parallel and/or contemporaneously) control the page buffers 376(0)-376(3) to charge/discharge bitlines, sense data from the two or more memory planes 372(0)-372(3), and/or latch the data.

Based on the signals received from local media controller 135, the driver circuits 374(0)-374(3) that are coupled to the memory planes 372(0)-372(3) associated with the group of memory command and address command pairs can select blocks of memory or memory cells from the associated memory plane 372(0)-372(3), for memory operations, such as read, program, and/or erase operations. The driver circuits 374(0)-374(3) can drive different respective global access lines associated with a respective memory plane 372(0)-372(3). As an example, the driver circuit 374(0) can drive a first voltage on a first global access line associated with the memory plane 372(0), the driver circuit 374(1) can drive a second voltage on a third global access line associated with the memory plane 372(1), the driver circuit 374(2) can drive a third voltage on a seventh global access line associated with the memory plane 372(2), etc., and other voltages can be driven on each of the remaining global access lines. In some examples, pass voltages can be provided on all access lines except an access line associated with a page of a memory plane 372(0)-372(3) to be accessed. The local media controller 135, the driver circuits 374(0)-374(3) can allow different respective pages, and the page buffers 376(0)-376(3) within different respective blocks of memory cells, to be accessed concurrently. For example, a first page of a first block of a first memory plane can be accessed concurrently with a second page of a second block of a second memory plane, regardless of page type.

The page buffers 376(0)-376(3) can provide data to or receive data from the local media controller 135 during the memory access operations responsive to signals from the local media controller 135 and the respective memory planes 372(0)-372(3). The local media controller 135 can provide the received data to memory sub-system controller 115.

It will be appreciated that the memory device 130 can include more or less than four memory planes, driver circuits, and page buffers. It will also be appreciated that the respective global access lines can include 8, 16, 32, 64, 128, etc., global access lines. The local media controller 135 and the driver circuits 374(0)-374(3) can concurrently access different respective pages within different respective blocks of different memory planes when the different respective pages are of a different page type.

In one embodiment, each of memory planes 372(0)-372(3) can represent a memory unit, and can be separately addressed by a multi-unit status command sent by multi-unit status component 113 of the memory sub-system controller 115. Local media controller 135 can track the status of one or more parameters separately for each of memory planes 372(0)-372(3), and thus, can generate a response to the multi-unit status command. As described above, the response to the multi-unit status command includes a multi-bit value representing a status of one or more parameters for the multiple memory units. In one embodiment, each bit of the multi-bit value represents the status of a first parameter (e.g., ready/busy) for a corresponding one of the memory planes 372(0)-372(3). Since the multi-bit value generally includes eight bits, in an embodiment where there are four memory planes on the memory die, two bits of the multi-bit value can be associated with each of the four memory planes. Accordingly, the status of two different parameters can be included for each of the four memory planes. In another embodiment, one bit of the multi-bit value can be associated with each memory plane, and the status information for two memory dies can be included in the response (i.e., eight bits representing the status for two memory dies with four planes each). In yet another embodiment, one or more bits of the multi-bit value each represent a logical combination (e.g., using a Boolean OR operation) of multiple values each representing the status of a given parameter for a separate one of the memory planes. For example, the status of each of the memory planes in a given memory die can be logically combined into a single one-bit value. The same thing can be done for a number of other multi-plane memory dies. The resulting one-bit values for each memory die can be combined together to form the multi-bit value sent as a response to the multi-unit status command. Thus, the one-bit value for any one memory die can indicate whether any of the planes of that memory die have a particular status. Upon identifying that a given memory die has at least one plane in the particular status, multi-unit status component 113 can send a second status command directed to that given memory die to determine which plane has the particular status.

Figure 4:
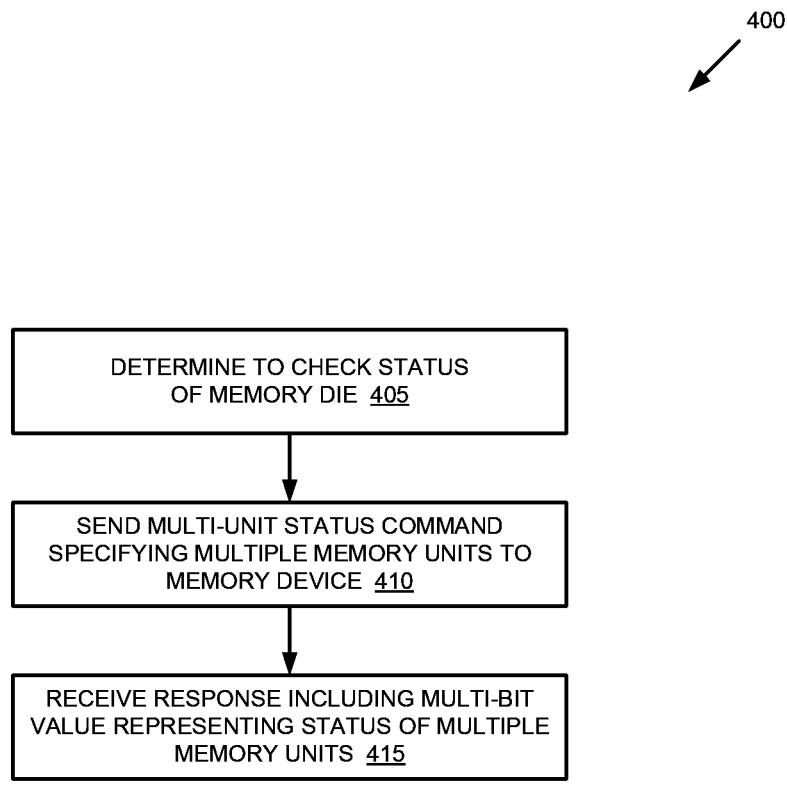
FIG. 4 is a flow diagram of an example method of checking the status of multiple memory dies in a memory sub-system in accordance with some embodiments of the present disclosure.

FIG. 4 is a flow diagram of an example method of checking the status of multiple memory dies in a memory sub-system in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by multi-unit status component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, it is determined to check a status of memory dies of the memory device. For example, the processing logic (e.g., multi-unit status component 113 executed by processor 117 of memory sub-system controller 115) determines whether to check a status of one or more dies 240(a)-(h) of a memory device 130. For example, as part of performing certain access operations, the memory sub-system controller 115 can check the status of certain parameters of the memory dies, which are associated with a communication channel (e.g., part of the NVMe interface) coupled between memory sub-system controller 115 and memory device 130. In one embodiment, the processing logic determines that the status should be checked in accordance with determining that a memory access operation is to be executed.

At operation 410, a multi-unit status command is sent. For example, responsive to determining that the status is to be checked as part of the memory access operation, the processing logic sends a multi-unit status command to the memory device 130, the multi-unit status command specifying multiple memory units associated with the one or more memory dies 240(a)-(h) of the memory device 130. In one embodiment, each memory unit includes a LUN associated with one of the memory dies 240(a)-(h). In another embodiment, each memory unit includes a separate plane or group of planes (e.g., one or more memory planes 372(0)-372(3) of a multi-plane memory die, as shown FIG. 3).

At operation 415, a response to the multi-unit status command is received. For example, the processing logic receives a response to the multi-unit status command, the response including a multi-bit value representing a status of one or more parameters for the multiple memory units. In one embodiment, each bit of the multi-bit value represents the status of a first parameter for a corresponding one of the memory units. For example, the status of the first parameter can indicate whether an input/output (I/O) status of the LUN or plane is in a ready state or a busy state. In one embodiment, each bit of the multi-bit value is associated with the corresponding one of the multiple memory units based on the MDS addressing scheme. In another embodiment, the memory units are specified using a unique address designated for purposes of performing a multi-unit status check operation. For example, if a memory unit includes a LUN associated with a memory die, each bit of the multi-bit value can indicate a status of a parameter for that LUN. If, however, the memory unit includes a plane of a memory die, regardless of the addressing scheme used, each bit of the multi-bit value represents the status of a parameter for that plane. In addition, as described above, one or more bits of the multi-bit value can represent a logical combination (e.g., as a result of a Boolean OR operation) of multiple values each representing the status of the parameter for each of multiple planes. In response to determining that the status of LUN or plane is in a ready state, multi-unit status component 113 can send an I/O command to the corresponding memory unit, as is described in more detail below with respect to FIG. 5.

Figure 5:
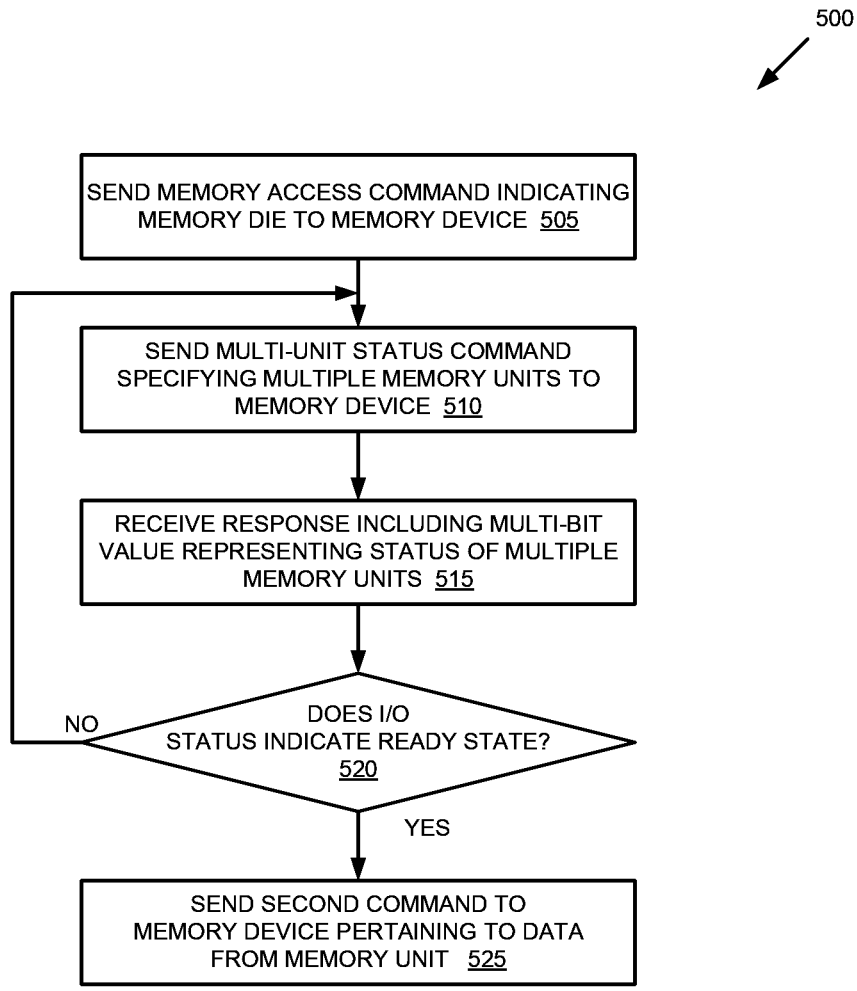
FIG. 5 is a flow diagram of an example method of performing a memory access operation including checking the status of multiple memory dies in a memory sub-system in accordance with some embodiments of the present disclosure.

FIG. 5 is a flow diagram of an example method of performing a memory access operation including checking the status of multiple memory dies in a memory sub-system in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by multi-unit status component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, a memory access command is sent. For example, the processing logic (e.g., multi-unit status component 113 executed by processor 117 of memory sub-system controller 115) sends at least one of a read command, a write command, or an erase command to a memory device 130, the command indicating data stored on a first memory die 240(a) of multiple memory dies 240(a)-(h) of the memory device 130 coupled to a communication channel 230. In one embodiment, the request can be received from host system 120 and can pertain to data stored by host system 120 in memory sub-system 110. In one embodiment, the request can be generated internally to memory sub-system 110, such as by memory sub-system controller 115, and can pertain to data management operations. Other memory access operations can include, for example, program operations, read operations, or erase operations. Host system 120 or memory sub-system controller 115 can send requests and/or commands to memory device 130, such as to store data on a memory device 130 or to read data from memory device 130. In one embodiment, the requests are directed to data in different memory units of memory device 130, such as different memory dies 240(a)-(h) or different memory planes 372(0)-372(3) of a memory die.

At operation 510, a multi-unit stat command is sent. For example, the processing logic sends a multi-unit status command to the memory device 130, the multi-unit status command specifying multiple memory units associated with the multiple memory dies 240(a)-(h) of the memory device 130. In one embodiment, each memory unit includes a LUN associated with one of the memory dies 240(a)-(h). In another embodiment, each memory unit includes a separate plane or group of planes (e.g., one or more memory planes 372(0)-372(3) of a multi-plane memory die, as shown FIG. 3).

At operation 515, a response is received. For example, the processing logic receives a response to the multi-unit status command, the response including a multi-bit value representing an input/output (I/O) ready/busy status of each of the multiple memory units. In one embodiment, each bit of the multi-bit value represents the status of a first parameter for a corresponding one of the memory units. For example, the status of the first parameter can indicate whether an input/output (I/O) status of the LUN or plane is in a ready state or a busy state. In one embodiment, each bit of the multi-bit value is associated with the corresponding one of the multiple memory units based on the MDS addressing scheme. In another embodiment, the memory units are specified using a unique address designated for purposes of performing a multi-unit status check operation. For example, if a memory unit includes a LUN associated with a memory die, each bit of the multi-bit value can indicate a status of a parameter for that LUN. If, however, the memory unit includes a plane of a memory die, regardless of the addressing scheme used, each bit of the multi-bit value represents the status of a parameter for that plane. In addition, as described above, one or more bits of the multi-bit value can represent a logical combination (e.g., as a result of a Boolean OR operation) of multiple values each representing the status of the parameter for each of multiple planes.

At operation 520, a status of the memory unit is determined. For example, the processing logic determines whether the multi-bit value indicates that a first memory unit corresponding to the first memory die has a ready state. In one embodiment, multi-unit status component 113 examines the bit of the multi-bit value corresponding to the first memory unit. For example, if the first memory unit is a LUN associated with the first memory die 240(a), multi-unit status component 113 can identify the corresponding bit using the MDS addressing scheme. In one embodiment, this bit can be set to a first value (e.g., 0) to indicate a first state (e.g., the ready state) or to a second value (e.g., 1) to indicate a second state (e.g., the busy state) for a given LUN, or vice versa. Thus, if the bit is set to the value indicating the ready state, multi-unit status component 113 can determine that the LUN associated with the first memory die 240(a) is in the ready state. The ready state can indicate that the data requested with respect to the read command at operation 505 has been retrieved from the memory cells of the first memory die 240(a). If multi-unit status component 113 determines that the memory unit is not in the ready state (i.e., is still in the busy state where the requested data has not yet been retrieved), processing returns to operation 510 where another multi-unit status command is sent after a periodic interval. The periodic interval can be configurable based on the specific implementation, but can include for example, one microsecond.

In response to determining that the multi-bit value indicates that the first memory unit corresponding to the first memory die has a ready state, at operation 525, a second command pertaining to data from the memory unit is sent. For example, the processing logic can send a readout command to the memory device 130 requesting the data from the first memory die 240(a). The readout command causes the memory device 130 to return the data from the first memory die 240(a) to the memory sub-system controller 115 via communication channel 230. In other embodiments, some other memory access or I/O operation can be performed.

Figure 6:
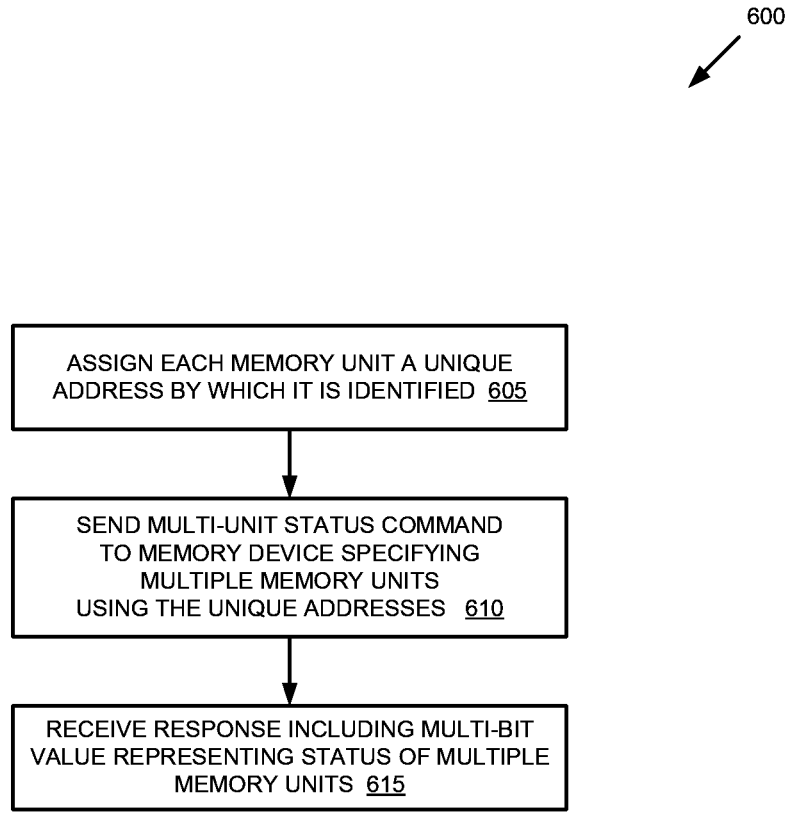
FIG. 6 is a flow diagram of an example method of checking the status of multiple memory dies in a memory sub-system using unique addresses in accordance with some embodiments of the present disclosure.

FIG. 6 is a flow diagram of an example method of checking the status of multiple memory dies in a memory sub-system using unique addresses in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by multi-unit status component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, a unique address is assigned to each memory unit. For example, the processing logic (e.g., multi-unit status component 113 executed by processor 117 of memory sub-system controller 115) assigns each of multiple memory units associated with one or more memory dies 240(a)-(h) of a memory device 130 a unique address by which each of the memory units is identified. In one embodiment, each memory unit includes a LUN associated with one of the memory dies 240(a)-(h). In another embodiment, each memory unit includes a separate plane or group of planes (e.g., one or more memory planes 372(0)-372(3) of a multi-plane memory die, as shown FIG. 3). In one embodiment, multi-unit status component 113 defines a new address system designated for purposes of performing a multi-unit status check operation. Thus, the unique address assigned to each memory unit can be different from the LUN identifier specified under the MDS addressing scheme. Depending on the embodiment, the unique address assigned to each memory unit can be used solely for the purposes of performing a multi-unit status check operation or can be used for some other purpose in addition. Such an addressing system can be useful for polling status in the chip enable (CE) domain, since with MDS addressing, two different CEs can have duplicate addresses. The addressing system includes unique addresses throughout the CE domain. Depending on the embodiment, either the new addressing system or MDS addressing can be selected for implementation.

At operation 610, a multi-unit status command is sent. For example, the processing logic sends a multi-unit status command to the memory device 130, the multi-unit status command specifying multiple memory units using corresponding unique address assigned at operation 405. For example, the multi-unit status command can include individual addresses of multiple memory units (e.g., LUNs and/or planes) or a range of unique addresses. In one embodiment, the command specifies a subset of all the memory units in the memory sub-system, where the subset can include two or more memory units up to all of the memory units. In one embodiment, the multiple memory units are associated with a single memory die. In another embodiment, the multiple memory units are associated with multiple memory dies. The unique addressing system is not limited to any number of memory units. For example, the multi-unit status command can specify a range of unique addresses that is greater than eight memory units. A local media controller 135 on memory device 130 can receive the multi-unit status command and identify the memory units corresponding to the unique addresses included in the multi-unit status command.

At operation 615, a response is received. For example, the processing logic receives a response to the multi-unit status command, the response including a multi-bit value representing a status of one or more parameters for the multiple memory units. In one embodiment, each bit of the multi-bit value represents the status of a first parameter for a corresponding one of the memory units. For example, the status of the first parameter can indicate whether an input/output (I/O) status of the LUN or plane is in a ready state or a busy state. In one embodiment, each bit of the multi-bit value is associated with the corresponding one of the multiple memory units based on the unique address specified in the multi-unit status command. For example, if a memory unit includes a LUN associated with a memory die, each bit of the multi-bit value can indicate a status of a parameter for that LUN. If, however, the memory unit includes a plane of a memory die each bit of the multi-bit value represents the status of a parameter for that plane. In addition, as described above, one or more bits of the multi-bit value can represent a logical combination (e.g., as a result of a Boolean OR operation) of multiple values each representing the status of the parameter for each of multiple planes. In an embodiment, where a single multi-unit status command specifies a range of unique addresses that is greater than eight memory units, multi-unit status component 113 can receive multiple multi-bit values. For example, each multi-bit value can include eight bits, and any number of multi-bit values can be received in order to represent the status of each of the memory units specified in the command.

Figure 7:
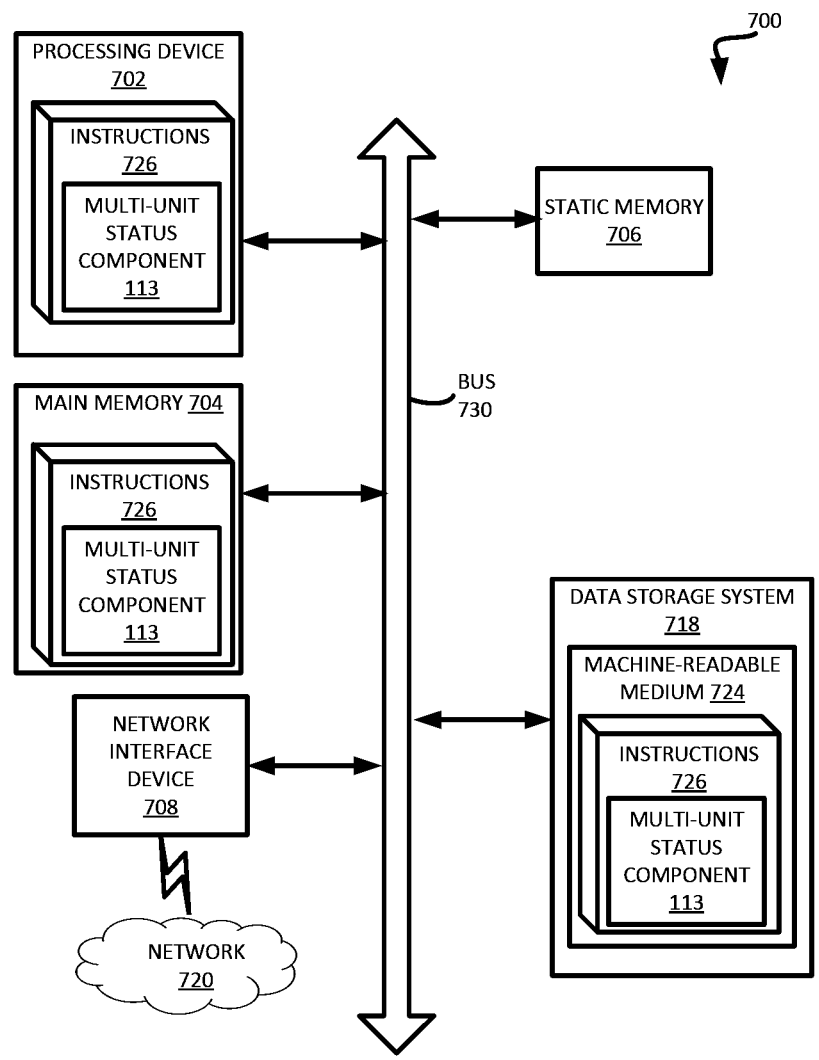
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to multi-unit status component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium, such a non-transitory computer-readable medium) on which is stored one or more sets of instructions 726 or software embodying any one or more of the methodologies or functions described herein. In one embodiment, this medium 724 is also writable by multi-unit status component 113, memory sub-system controller 115, or other components. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to multi-unit status component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
assigning each of a plurality of memory units associated with one or more memory die of the memory device a unique address by which each of the plurality of memory units is identified;
sending a multi-unit status command to the memory device, the multi-unit status command specifying a subset of the plurality of memory units using corresponding unique addresses; and
receiving a response to the multi-unit status command, the response comprising a multi-bit value comprising a plurality of bits, wherein each bit of the plurality of bits comprises a value formed from a logical combination of a plurality of values each representing the status of a corresponding parameter for each memory unit of the subset of the plurality of memory units, and wherein at least two of the plurality of memory units are represented in the multi-bit value of the response.

2. The system of claim 1, wherein the one or more memory die are associated with a communication channel coupled to the memory device, and wherein the plurality of memory units comprises a plurality of logical unit numbers (LUNs).

3. The system of claim 1, wherein each bit of the multi-bit value represents the status of a first parameter for a corresponding one of the subset of the plurality of memory units.

4. The system of claim 3, wherein the status of the first parameter comprises an indication of whether an input/output (I/O) status is in a ready state or a busy state.

5. The system of claim 4, wherein the processing device to perform further operations comprising:
determining that the status of the first parameter corresponding to a first memory unit indicates that the I/O status is in the ready state; and
sending an I/O command to the first memory unit.

6. The system of claim 1, wherein a first memory die of the one or more memory die comprises a plurality of planes, and wherein each of the plurality of memory units comprises one of the plurality of planes.

7. The system of claim 6, wherein the multi-bit value represents the status of a first parameter for each of the plurality of planes.

8. The system of claim 6, wherein a first bit of the multi-bit value represents a logical combination of a plurality of values each representing the status of a first parameter for each of a plurality of planes.

9. A method comprising:
assigning each of a plurality of memory units associated with one or more memory die of a memory device a unique address by which each of the plurality of memory units is identified;
sending a multi-unit status command to the memory device, the multi-unit status command specifying a subset of the plurality of memory units using corresponding unique addresses; and
receiving a response to the multi-unit status command, the response comprising a multi-bit value comprising a plurality of bits, wherein each bit of the plurality of bits comprises a value formed from a logical combination of a plurality of values each representing the status of a corresponding parameter for each memory unit of the subset of the plurality of memory units, and wherein at least two of the plurality of memory units are represented in the multi-bit value of the response.

10. The method of claim 9, wherein the one or more memory die are associated with a communication channel coupled to the memory device, and wherein the plurality of memory units comprises a plurality of logical unit numbers (LUNs).

11. The method of claim 9, wherein each bit of the multi-bit value represents the status of a first parameter for a corresponding one of the subset of the plurality of memory units.

12. The method of claim 11, wherein the status of the first parameter comprises an indication of whether an input/output (I/O) status is in a ready state or a busy state.

13. The method of claim 12, further comprising:
determining that the status of the first parameter corresponding to a first memory unit indicates that the I/O status is in the ready state; and
sending an I/O command to the first memory unit.

14. The method of claim 9, wherein a first memory die of the one or more memory die comprises a plurality of planes, and wherein each of the plurality of memory units comprises one of the plurality of planes.

15. The method of claim 14, wherein the multi-bit value represents the status of a first parameter for each of the plurality of planes.

16. The method of claim 14, wherein a first bit of the multi-bit value represents a logical combination of a plurality of values each representing the status of a first parameter for each of a plurality of planes.

17. A non-transitory computer-readable storage medium comprising instructions that, when executed by a processing device, cause the processing device to perform operations comprising:
assigning each of a plurality of memory units associated with one or more memory die of a memory device a unique address by which each of the plurality of memory units is identified;
sending a memory access command to the memory device, the memory access command indicating data stored on a first memory die of the plurality of memory die of the memory device coupled to a communication channel;

sending a multi-unit status command to the memory device, the multi-unit status command specifying a subset of the plurality of memory units using corresponding unique addresses;

receiving a response to the multi-unit status command, the response comprising a multi-bit value representing a input/output (I/O) ready/busy state of each of the subset of the plurality of memory units, wherein each bit of the multi-bit value comprises a value formed from a logical combination of a plurality of values representing the I/O read/busy state for the plurality of memory units; and in response to determining that the multi-bit value indicates that a first memory unit corresponding to the first memory die has a ready state, sending a second command to the memory device, the second command pertaining to the data from the first memory die.

18. The non-transitory computer-readable storage medium of claim 17, wherein the plurality of memory units comprises a plurality of logical unit numbers (LUNs).

19. The non-transitory computer-readable storage medium of claim 17, wherein each bit of the multi-bit value represents the status of a parameter for a corresponding one of the subset of the plurality of memory units.

20. The non-transitory computer-readable storage medium of claim 17, wherein the memory device comprises a multi-plane memory device, and wherein the plurality of memory units comprises a plurality of planes of the multi-plane memory device.

\* \* \* \* \*